Frank T. Moser
INVENTOR.

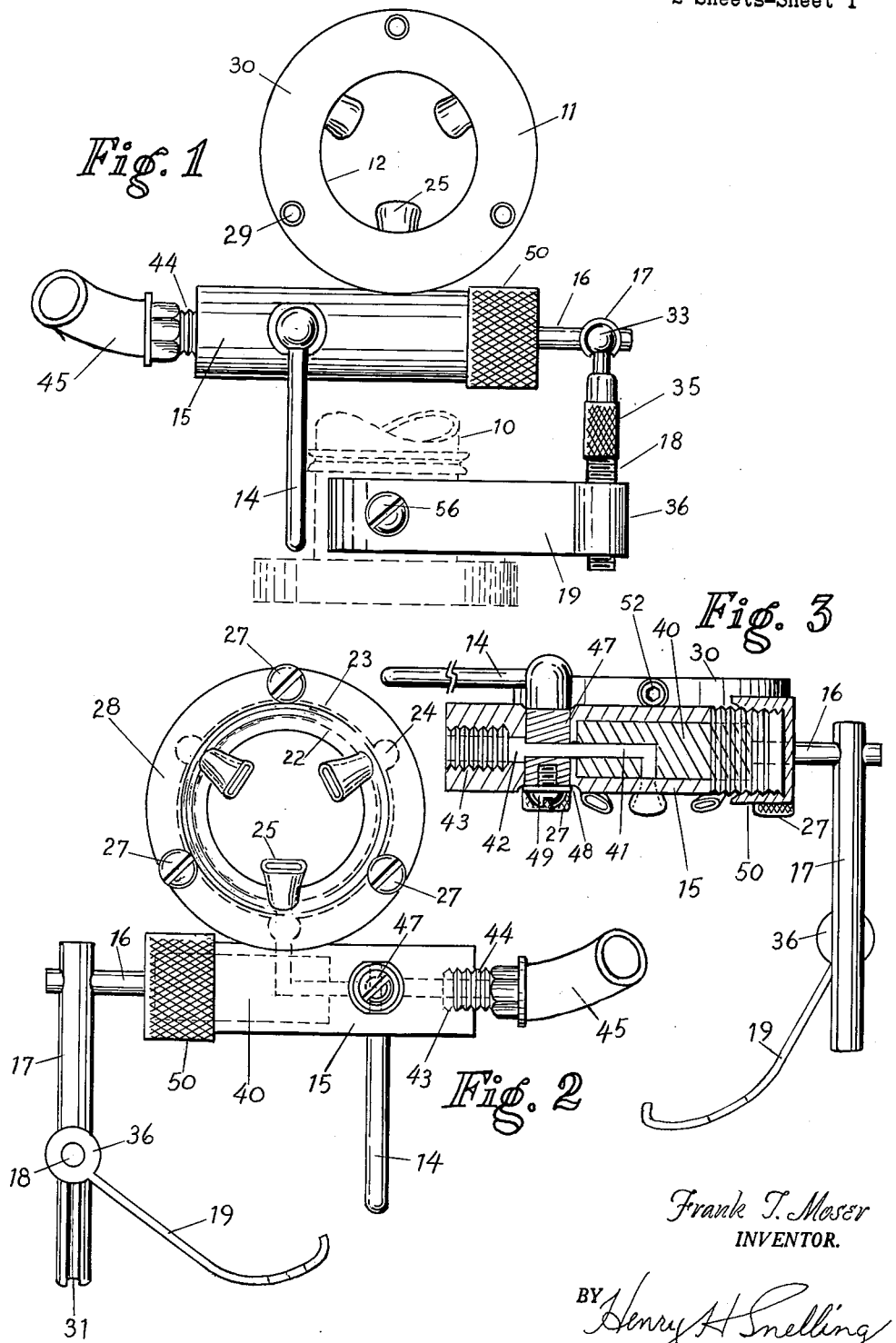

BY Henry H Snelling

United States Patent Office 2,978,996
Patented Apr. 11, 1961

2,978,996
VARIEGATOR ATTACHMENT FOR SOFT FROZEN CONFECTION FREEZER

Frank T. Moser, Allentown, Pa., assignor, by mesne assignments, to Mister Softee, Inc., Runnemede, N.J., a corporation of Pennsylvania Filed Mar. 24, 1959, Ser. No. 801,517

6 Claims. (Cl. 107—1)

This invention relates to freezers of the type delivering a soft, partially frozen, extruded body of ice cream, frozen custard or similar frozen confection. It has for its principal object the provision of means for applying edible ribbons of material such as an additional flavoring to the outside surface of the cylindrical flowing confection as it emerges from the freezer.

An important object of the invention is to provide mechanism of this type which can readily be attached to an existing machine, is exceptionally rugged, so compact that it is entirely out of the way of the dispensing operator and is easily assembled and disassembled for cleaning by one not particularly familiar with mechanism.

A further object of the invention is to provide a device which will form one or more grooves in the core of the ice cream or frozen custard flowing from a freezer and deposit in the grooves an edible material preferably but not necessarily of a strikingly contrasting color, for example chocolate ribbons to stripe a vanilla core. Such ribbons although normally parallel to the axis of the core of ice cream or frozen custard may be made spiral by turning the usual baked cone about its own axis while it is receiving the confection and the variegating material from the freezer, or the confection may be deposited in a box in which case the sauce is interspersed within the ice cream.

A further object of the invention is to provide means in the striping attachment for insuring that the amount of sauce is carefully adjusted to the quantity of ice cream delivered so that the device, while adding materially to the attractive appearance of the delivered product, provides an economical and practical addition to the freezer, and one which is economical to build and operate.

In the drawings:

Fig. 1 is a plan view of the attachment, showing the draw-off valve of the freezer in dashed lines.

Fig. 2 is a bottom plan view.

Fig. 3 is a vertical central section through the cylinder.

Figure 4:
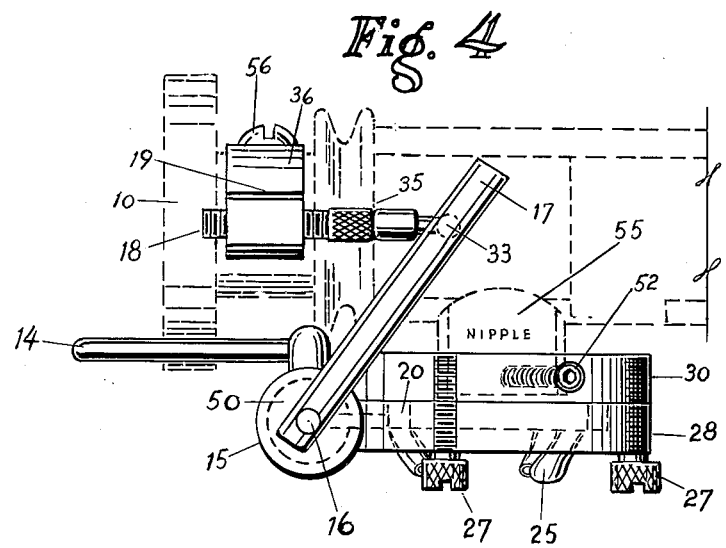
Fig. 4 is a side elevation with parts of the freezer in dashed lines.

In Fig. 1 the draw-off valve 10 of an ice cream or frozen confection freezer of well-known type is shown in dashed lines to orient the device which is shown here in plan view. As usual the valve 10 is moved horizontally by the operator so that it moves up and down as seen in this figure. Such movement causes frozen confection to be discharged intermittently first horizontally and then in a vertical direction passing through the center of ring 11 at the top of the figure. The inner cylindrical surface 12 of the ring loosely receives the cylindrical mass of confection which is discharged in a manually controlled manner from the vertical nipple of the freezer not shown in this figure. The confection itself therefore passes upwardly in Fig. 1 through the center of draw-off valve 10 and then passes vertically downward through an elbow (not shown) in the pipe. The operator while moving the draw-off valve 10 holds a cone or a box or other receptacle beneath the nipple discharge to catch the descending column of the ice cream.

The ring 11 delivers one or more, preferably three, ribbons of material such as a chocolate sauce to supply both flavoring and attractiveness to the material sold. The sauce is fed from a suitable source (not shown) usually under pressure from a gas of the type common in discharging edible products, the specific reservoir and method of feeding the material to the present device forming no portion of the invention. The flavoring material passes through a cylinder 15, housing a rotary valve 40 coaxial with the cylinder and fastened to a shaft 16. This shaft is connected to the draw-off valve 10 by linkage members 17, 18 and 19 so that whenever the operator moves valve 10 to cause the custard or other confection to be discharged, the chocolate sauce will simultaneously be fed through the ring 11 and be deposited on or in the moving column of softly frozen confection.

The handle 14 governs a simple shut-off valve 47 and is manually closed when it is desired to dispense plain ice cream or frozen custard but is normally fully open as the valve on shaft 16 controls the predetermined but readily adjustable amount of sauce to be applied to the confection so that thinner or thicker ribbons of chocolate may be fed to the confection as determined by the adjustment of linkage member 18 later described in detail.

Referring now particularly to Figure 2, the ring 11 consists of two annular plates, the top plate 30 consisting of a mere annulus being a cover for a groove 20 in the bottom plate 28 this groove having a smooth inner surface 22 and a coaxial surface 23 broken however by recesses 24 corresponding in number to the nozzles 25 here shown as three in number extending radially and sloping downwardly and inwardly toward the axis of the ring. The length of the nozzles could readily be made adjustable by threading the nozzles into the ring but I find it perfectly satisfactory to insert the nozzles by a mere force fit. As the nozzles extend inwardly they also expand transversely as may best be seen in Figure 2 in which we are looking at the device from the bottom.

Figure 5:
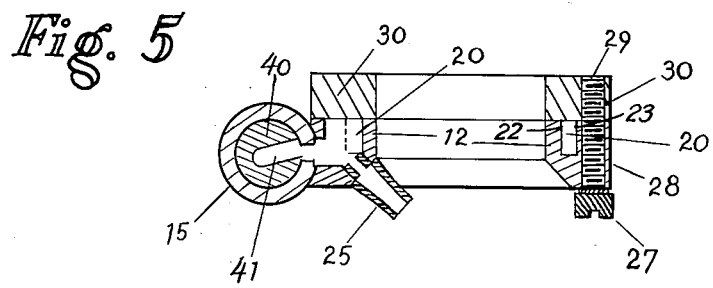
Fig. 5 is a vertical central section through the cylinder and ring.

A number of screws 29 having somewhat oversized heads 27 secure the bottom plate 28 to the upper annulus 30 not shown in this figure but well shown in Figs. 1 and 5. As best seen in Fig. 2 the elongated lever 17 connecting the shaft 16 to the curved link 19 is conveniently made of a simple metal tube slotted as at 31 to receive the ball head 33 of linkage member 18 so as to provide a sliding connection between the elongated lever 17 and the adjusting screw 18 by means of which the curved link 19 fastened to the draw-off valve may alter the throw of the valve on shaft 16 thus increasing or decreasing the amount of chocolate sauce discharged in any one operation of the freezer draw-off valve. By turning the knurled section 35 the distance between the boss 36 on link 19 and the elongated lever 17 may be changed by rather wide limits. The more the screw member 18 is screwed into the threaded boss 36 the more sauce is delivered and similarly by turning the knurled portion 35 to take the screw 18 out of the link 19 the less sauce is delivered.

Fig. 3 is a section through the center of cylinder 12 but for convenience of illustration the elongated lever 17 is shown as extending down whereas in actual practice it would extend up at an angle. The rotary valve 40 fast to shaft 16 has a right angular passage way 41 communicating with the entrance port 42 threaded as at 43 to receive a fitting 44 to connect the tubing 45 from the source of supply. The cut-off valve connected to handle 14 is numbered 47 and is held in place by a washer 48 and screw 49. As previously stated this valve normally merely opens the passageway 41—42 freely or shuts it off entirely. A threaded cap 50 closes the end of the cylinder, having a central hole to receive the shaft 16. The annular ring plate 30 which closes the circular recess 20 in bottom plate 28 carries a set screw 52 by which the attachment is secured to the discharge nipple 55 of the freezing device such nipple being shown in Fig. 4.

The operation of the device can probably best be explained in connection with Figure 4 which is a view looking toward the capped end of the cylinder, that is toward the right side of Fig. 1. The ice cream or custard is fed from the left of Fig. 4 centrally through the draw-off valve 10 of the frozen confection freezer and is discharged vertically downward through the discharge nipple 55 to which the ring composed of the two halves 28 and 30 is secured by means of a set screw 52. The attachment is supported by this engagement and by the screw 56 which fastens the curved link 19 to the draw-off valve 10 of the freezer.

A plurality of nozzles 25 extend downwardly and inwardly from the ring so that they extend into the path of the downwardly moving, cylindrical mass of ice cream by a chosen amount preferably about 1/16 of an inch thus forming grooves in the body of the ice cream. Chocolate sauce from a suitable reservoir not shown is fed to the far end of cylinder 15 at the lower right-hand corner of this figure. An ordinary shut-off valve 47 controlled by a handle 14 may cut off the supply of chocolate sauce when desired, such valve normally being open.

A control valve 40 best seen in Figure 3 is fast to shaft 16 coaxial with the cylinder or sleeve 12. Its movement through an angle of about 30° governs the amount of chocolate sauce passing from the reservoir to the groove 20 in the ring. The amount of sauce delivered is readily controlled by turning the knurled portion 35 of screw link 18 so that the rotary valve 40 permits more or less of the chocolate sauce to flow to the ring so that an operator may if he desires discharge a small amount of chocolate to cover the bottom of the vertical groove made in the ice cream by the nozzles or he may fill the groove entirely, or in exceptional cases he may discharge a greater quantity of flavoring or ornamenting sauce to overflow the grooves made by the nozzles.

The device can be removed from the freezer by releasing merely two screws, i.e. the set screw 52 which fastens the device to the nipple 55 and the screw 56 which secures the link 19 to the draw-off valve 10. When removed from the machine the entire mechanism can very readily be taken apart by an inexperienced person. The rotary valve can be pulled directly out as soon as the cap 50 is unscrewed. The cut-off valve 47 likewise can be removed by simply taking out the screw 49. The two halves of the ring can be separated by turning the large heads 27 of screw 29. The top half 30 of the ring has no surfaces to collect dirt. Although the bottom half 28 of the ring is fast to the outer shell of the cylinder 12 this does not interfere in any way with the cleaning and sterilizing of the parts, in fact I find no need to remove the three nipples 25 during the operation.

What I claim is:

1. An attachment for securing to a soft frozen confection extruder having a draw-off valve and discharging a cylindrical core of the confection, comprising a hollow ring adapted to be detachably secured to the extruder coaxial with said core, a plurality of equispaced nozzles radially extending from the hollow ring and extending inwardly from the inner surface of the ring to intersect the core to form a plurality of grooves therein as the core moves, a rotary valve movable to discharge a sauce through the ring to the nozzles and adjustable means connecting the draw-off valve of the extruder with said rotary valve.

2. The combination of claim 1 in which the means connecting the rotary valve with the draw-off valve includes linkage members, one of which has a threaded engagement with another member of the linkage so that the throw of the rotary valve may be controlled at will.

3. The device of claim 1 in which the means comprises a shaft secured to the rotary valve, an elongated lever extending at right angles to the shaft, a curved link adapted to be secured to the draw-off valve by a readily removable fastening, and a member having a connection with the elongated lever and with the curved link; and the hollow ring is secured to the extruder by a second readily removable fastening, said two readily removable fastenings being the sole support of the attachment whereby the attachment may quickly be removed for cleaning.

4. A variegator for attachment to an extruder of the type having a draw-off valve to be manually operated at intervals to discharge a core of soft frozen confection, said variegator comprising a hollow ring, fastening means for securing the ring to the extruder coaxial with said core, a plurality of radially positioned nozzles communicating with the hollow in the ring and extending inwardly toward the axis of the ring so as to intercept the core to form grooves therein as the soft core moves, means for discharging an edible material into the ring, through the nozzles and into the said grooves formed by the nozzles, and mechanism operatively connecting the discharging means to the extruder draw-off valve whereby the edible material is discharged during periods of manual operation of the extruder.

5. The variegator of claim 4 in which the discharging means includes a cylinder communicating with the ring, and a rotary valve therein moved by said mechanism for determining the quantity of sauce delivered to the groove.

6. Linkage adapted to connect a rotary dispensing valve with the draw-off valve of a freezer for discharging a core of soft frozen confection, comprising a shaft secured to the rotary valve, an elongated lever extending at right angles to the shaft, a curved link adapted to be secured to the draw-off valve, and a threaded member having a spherical head freely slidable in the elongated lever and having threaded engagement with the link.

References Cited in the file of this patent

UNITED STATES PATENTS

| | | |
|---|---|---|
| 279,131 | Chase | June 12, 1883 |
| 817,080 | Mahoney | Apr. 3, 1906 |
| 1,121,434 | Westerman | Dec. 15, 1914 |
| 1,493,082 | Laskey | May 6, 1924 |
| 2,246,871 | Balch | June 24, 1941 |
| 2,284,651 | Gundlach et al. | June 2, 1942 |
| 2,313,060 | Friedman | Mar. 9, 1943 |
| 2,316,165 | Howser | Apr. 13, 1943 |
| 2,667,846 | Grumbly | Feb. 2, 1954 |
| 2,758,553 | Moser | Aug. 14, 1956 |
| 2,873,887 | Spero | Feb. 17, 1959 |

Disclaimer 2,978,996.—*Frank T. Moser*, Allentown, Pa. VARIEGATOR ATTACHMENT FOR SOFT FROZEN CONFECTION FREEZER. Patent dated Apr. 11, 1961. Disclaimer filed Oct. 23, 1964, by the assignee, *Mister Softee, Inc.*

Hereby enters this disclaimer to the entire term of said patent.

[*Official Gazette February 2, 1965.*]